United States Patent
Black et al.

(10) Patent No.: US 9,407,820 B2
(45) Date of Patent: Aug. 2, 2016

(54) METHOD AND APPARATUS FOR INHIBITING DIVERSION OF DEVICES USING AN EMBEDDED ACCELEROMETER

(71) Applicant: RAYTHEON COMPANY, Waltham, MA (US)

(72) Inventors: Stephen H. Black, Buellton, CA (US); Paolo Masini, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 365 days.

(21) Appl. No.: 13/768,505

(22) Filed: Feb. 15, 2013

(65) Prior Publication Data
US 2015/0271403 A1 Sep. 24, 2015

Related U.S. Application Data

(60) Provisional application No. 61/599,699, filed on Feb. 16, 2012.

(51) Int. Cl.
| | | |
|---|---|---|
| *G01P 15/00* | (2006.01) | |
| *H04N 5/232* | (2006.01) | |
| *G01P 15/08* | (2006.01) | |
| *G01J 1/02* | (2006.01) | |
| *H04N 5/33* | (2006.01) | |

(52) U.S. Cl.
CPC .......... *H04N 5/23241* (2013.01); *G01J 1/0228* (2013.01); *G01P 15/00* (2013.01); *G01P 15/0891* (2013.01); *H04N 5/33* (2013.01); *G01J 2001/0257* (2013.01)

(58) Field of Classification Search
CPC . G01J 1/0228; G01J 2001/0257; G01P 15/00; G01P 15/0891; H04N 5/23241
USPC .................................................. 73/492, 497
See application file for complete search history.

(56) References Cited

U.S. PATENT DOCUMENTS

| | | | |
|---|---|---|---|
| 5,815,407 A | 9/1998 | Huffman et al. | |
| 7,248,210 B2 | 7/2007 | Bruce et al. | |
| 8,217,792 B2 * | 7/2012 | Wehrenberg | G08B 13/1409 340/539.11 |
| 8,856,474 B2 * | 10/2014 | Ise | G11C 16/16 711/164 |
| 8,909,209 B2 * | 12/2014 | Bradley | H04M 1/72577 381/59 |
| 9,038,188 B2 * | 5/2015 | Adams | G07F 7/1008 711/163 |
| 2004/0211573 A1 * | 10/2004 | Carrier | B25F 5/00 173/2 |
| 2004/0230809 A1 * | 11/2004 | Lowensohn | G06F 21/35 713/186 |

(Continued)

FOREIGN PATENT DOCUMENTS

DE 10-2009-045942 A1 4/2011

OTHER PUBLICATIONS

International Search Report and Written Opinion from corresponding International Application No. PCT/US2013/026379 mailed Jun. 6, 2013.

*Primary Examiner* — Freddie Kirkland, III
(74) *Attorney, Agent, or Firm* — Lando & Anastasi, LLP

(57) ABSTRACT

According to one aspect, embodiments herein provide a sensing device comprising an accelerometer configured to monitor acceleration of the sensing device and provide acceleration information including a value of the acceleration of the sensing device, and an Integrated Circuit (IC) coupled to the accelerometer, the IC configured to receive the acceleration information from the accelerometer and render the sensing device permanently inoperable in response to the value of the acceleration of the sensing device exceeding a threshold indicative of a military application of the sensing device.

18 Claims, 4 Drawing Sheets

(56) References Cited

U.S. PATENT DOCUMENTS

| | | | |
|---|---|---|---|
| 2005/0012591 A1 | 1/2005 | Tomljenovic et al. | |
| 2007/0008162 A1* | 1/2007 | Gossett | B25C 7/00 340/680 |
| 2009/0224889 A1* | 9/2009 | Aggarwal | G06F 19/323 340/10.4 |
| 2010/0257743 A1 | 10/2010 | George | |
| 2011/0131649 A1* | 6/2011 | Lang | G06F 21/79 726/19 |
| 2011/0179494 A1* | 7/2011 | Adams | G07F 7/1008 726/26 |
| 2011/0227736 A1* | 9/2011 | Wehrenberg | G08B 13/1409 340/571 |
| 2012/0032834 A1 | 2/2012 | Weeks | |
| 2012/0084526 A1* | 4/2012 | Ise | G11C 16/16 711/164 |
| 2012/0278907 A1* | 11/2012 | Wehrenberg | G08B 13/1409 726/35 |
| 2012/0279742 A1 | 11/2012 | Roser | |

* cited by examiner

METHOD AND APPARATUS FOR INHIBITING DIVERSION OF DEVICES USING AN EMBEDDED ACCELEROMETER

RELATED APPLICATION

This application claims priority under 35 U.S.C. §119(e) to U.S. Provisional Application No. 61/599,699, entitled "METHOD AND APPARATUS FOR INHIBITING DIVERSION OF DEVICES USING AN EMBEDDED ACCELEROMETER," filed Feb. 16, 2012, which is hereby incorporated by reference in its entirety for all purposes.

BACKGROUND

Various attempts have been made to prevent certain leading edge commercial technologies (e.g., such as imaging or electro-optical devices) from being adapted for military uses (e.g., such as weapons sights or fire control systems), since diversion of these technologies from the civilian market place to military applications may raise national security concerns. The attempts have included placing restrictions on the sale of night vision technology, including end user certification and tracking, for example. Additionally, the frame rate for general-use night vision equipment has been limited to ≤9 Hz, with the software required to increase the frame rate also being subject to United States (US) government export control regulations. In another example, requirements for some vehicular applications have been put in place to render a restricted unit inoperable when removed from a vehicle. However, these restrictions have encouraged the development of off-shore sources of the restricted technologies, which can undermine the effectiveness of the intended restrictions and/or erode the technological superiority of the US armed forces.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

SUMMARY OF INVENTION

Figure 1:
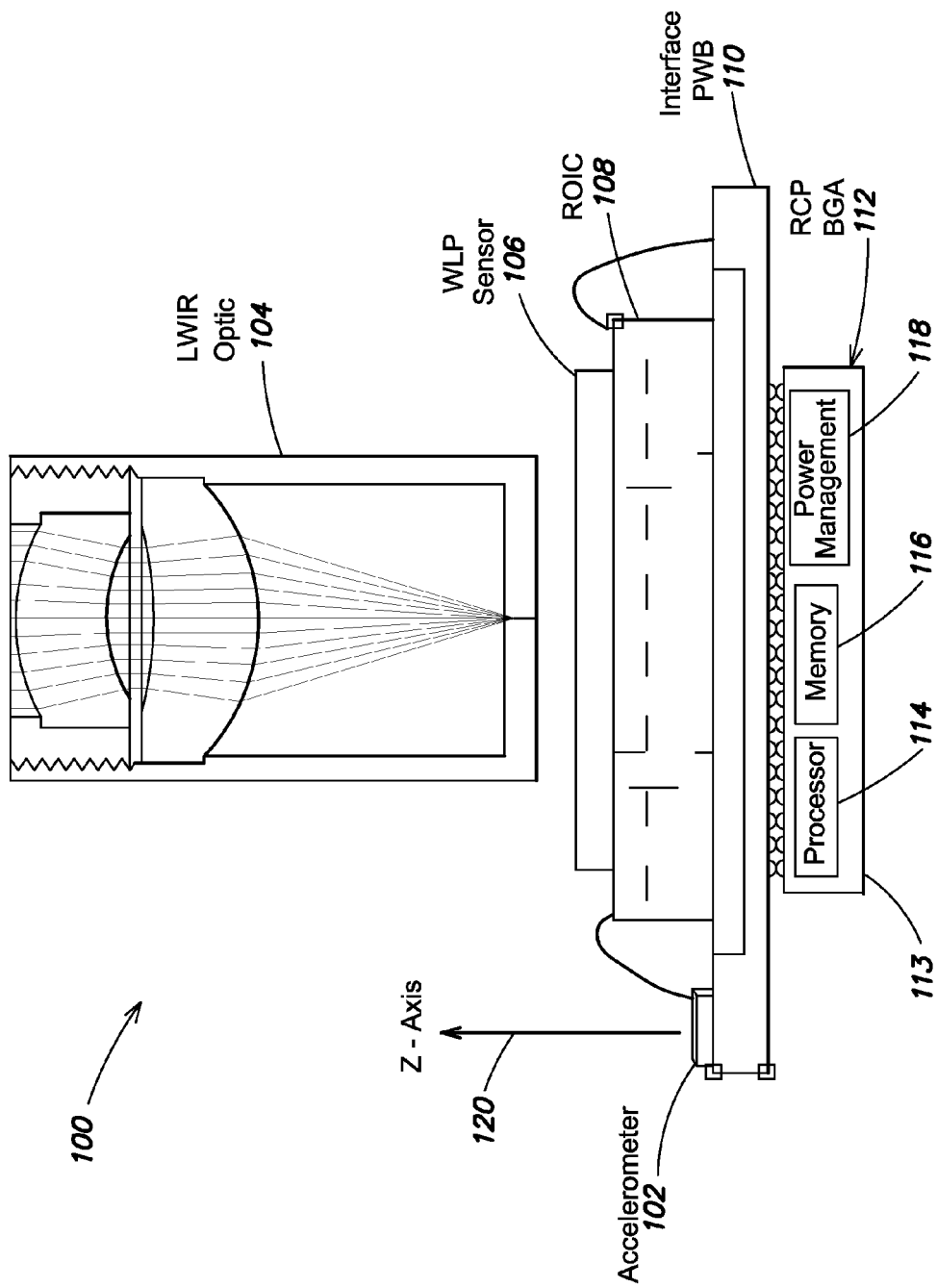
FIG. 1 is a block diagram of one example of an electro-optic device including an embedded accelerometer according to aspects of the invention.

Aspects and embodiments are directed to methods and mechanisms that allow technology to proliferate freely in the civilian marketplace, but render the technology inoperative should it be diverted to a high shock military environment. For example, a device, such as a thermal imager, laser, camera, electronics associated with night-vision equipment, or another electronic device, may be disabled, preferably permanently, upon detection of shock levels associated with a military application. According to one embodiment, the accelerometer (or other shock-sensing sensor) is embedded into the device hardware, particularly into integrated packages, such as Redistributed Chip Packaging (RCP), Multi-Chip System in a Package (MCSiP), or System on a Chip (SoC) packages in some examples, making it difficult to defeat the accelerometer function as attempts to do so may destroy the device hardware. In addition, the use of programmed unique identification numbers may also provide additional security, as discussed further below. Thus, aspects and embodiments may provide a simple and reliable mechanism for preventing diversion of high technology devices from the civilian marketplace into military applications, while still allowing the technology to be freely distributed within the civilian marketplace.

At least one aspect described herein is directed to a sensing device comprising an accelerometer configured to monitor acceleration of the sensing device and provide acceleration information including a value of the acceleration of the sensing device, and an Integrated Circuit (IC) coupled to the accelerometer, the IC configured to receive the acceleration information from the accelerometer and render the sensing device permanently inoperable in response to the value of the acceleration of the sensing device exceeding a threshold indicative of a military application of the sensing device.

According to one embodiment, the threshold is defined as a value of the acceleration greater than 100 g. According to another embodiment, the threshold is defined as a value of the acceleration in a range of approximately 50 to 1000 g.

According to another embodiment, the IC comprises a port coupled to the accelerometer, a flash memory module, and a processor coupled to the port and the flash memory module, wherein the processor is configured to receive the acceleration information from the accelerometer and transmit an erase command to the flash memory module, to render the sensing device permanently inoperable, in response to the value of the acceleration of the sensing device exceeding the threshold. In one embodiment, the processor is further configured to monitor a number of times that the value of the acceleration of the sensing device exceeds the threshold and to transmit the erase command to the flash memory module, to render the sensing device permanently inoperable, in response to the value of the acceleration of the sensing device exceeding the threshold at least a predefined number of times.

According to one embodiment, the accelerometer comprises a register that includes a first programmed Unique Identification Number (UIN), wherein the IC further comprises a memory module coupled to the processor, the memory module including a second programmed UIN, and wherein the processor is further configured to compare the first UIN with the second UIN and, in response to a determination that the first UIN and the second UIN are not identical, transmit the erase command to the flash memory module to render the sensing device permanently inoperable.

According to another embodiment, the optics module, the IC and the accelerometer are located within an integrated product housing. In another embodiment, the IC and the accelerometer are integrated within a high density package. In one embodiment, the IC and the accelerometer are integrated within a Redistributed Chip Package (RCP). In another embodiment, the IC and the accelerometer are integrated within a Multi-Chip System in a Package (MCSiP). In one embodiment, the IC and the accelerometer are integrated on a printed wiring board, and wherein the IC, the accelerometer and the printed wiring board are encapsulated within a housing.

According to one embodiment, the sensing device is an image sensor. In one embodiment, the image sensor is an infrared image sensor. In one embodiment, the infrared image sensor is sensitive to wavelengths in a range between 8 and 12 microns. In another embodiment, the infrared image sensor is sensitive to wavelengths in a range between 1.5 and 1.7 microns. In one embodiment, the image sensor is a visible image sensor. In another embodiment, the image sensor is a visible image sensor sensitive to wavelengths in a range between 400 nm and 800 nm.

Another aspect described herein is directed to a method for inhibiting an electronic device from being adapted for military uses, the method comprising monitoring acceleration of the electronic device with an accelerometer coupled to the electronic device, determining whether the acceleration of the electronic device monitored by the accelerometer exceeds a predetermined threshold indicative of a military application of the electronic device, and in response to a determination that the acceleration of the electronic device exceeds the threshold, permanently rendering the electronic device inoperable.

According to one embodiment, determining includes determining whether the acceleration of the electronic device exceeds a predetermined threshold of at least 100 g. In another embodiment, permanently rendering includes transmitting an erase command to a flash memory module within the electronic device.

According to another embodiment, the method further comprises monitoring a number of times that the acceleration of the electronic device exceeds the predetermined threshold, and in response to a determination that the acceleration of the electronic device has exceeded the predetermined threshold at least a predefined number of times, transmitting the erase command to the flash memory module within the electronic device to permanently render the electronic device inoperable.

According to one embodiment, the method further comprises comparing a Unique Identification Number (UIN) stored within the accelerometer to a UIN stored within the electronic device, and in response to a determination that the UIN stored within the accelerometer does not match the accelerometer, transmitting the erase command to the flash memory module within the electronic device to permanently render the electronic device inoperable. In one embodiment, comparing includes comparing a factory programmed serial number stored within the accelerometer to the UIN stored within the electronic device.

According to another embodiment, monitoring acceleration of the electronic device with an accelerometer includes monitoring acceleration of the electronic device with an accelerometer embedded in a high density package of the electronic device. In one embodiment, monitoring acceleration of the electronic device with an accelerometer embedded in a high density package of the electronic device includes monitoring acceleration of the electronic device with an accelerometer embedded in one of a Redistributed Chip Package (RCP) or Multi-Chip System in a Package (MCSiP) of the electronic device. In another embodiment, monitoring acceleration of the electronic device with an accelerometer includes monitoring acceleration of the electronic device with an accelerometer mounted on a printed wiring board of the electronic device and encapsulated within a housing.

One aspect as described herein includes an electronic device comprising an Integrated Circuit (IC), and means, coupled to the IC, for rendering the electronic device permanently inoperable in response to a shock level consistent with military application of the electronic device.

According to one embodiment, the electronic device further comprises means for inhibiting removal of the means for rendering without damage to the IC. In another embodiment, the electronic device further comprises means for determining whether the means for rendering has been removed and rendering the electronic device inoperable in response to a determination that the means for rendering has been removed.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

DETAILED DESCRIPTION

As the rate of technology proliferation increases, there is a concurrent risk of leading edge technology targeting the civilian market being diverted to military applications. For example, leading edge civilian technology from the United States may be acquired in the US, sent overseas, and diverted to military applications abroad. This diversion may negatively impact national security and the safety of US armed forces. As discussed above, prior attempts to address the issue of diversion have been limited to restricting the sale of technology to civilian markets, or implementing controls that tie the technology permanently to a specific platform. However, these restrictions may not be effective to deter diversion. Aspects and embodiments described herein are directed to methods and mechanisms that allow technology to proliferate freely in the civilian marketplace, but render the technology inoperative should it be diverted to a high shock military environment.

Certain embodiments are directed to the use of an embedded accelerometer to deter the diversion of advanced technology from the civilian marketplace to military applications. In one example, the advanced technology is rendered inert or inoperable when subjected to shock levels associated with a military application. In particular, some aspects and embodiments described herein are directed to preventing civilian electro-optic devices, such as cameras, imaging devices, or lasers, from being diverted to military applications such as weapons sights or fire control systems, by rendering the civilian electro-optics devices inoperable when subjected to shock levels associated with a military application.

It will be appreciated by those skilled in the art that shock levels associated with or indicative of a military application (e.g., the firing of a weapon) are typically associated with acceleration levels far greater than acceleration levels associated with non-military use. For example, non-military applications such as walking or shaking may register an acceleration level of less than 3 g (where 1 g is the acceleration due to gravity at the Earth's surface); while a military application, such as the firing of a rifle, for example, may register an acceleration level of more than 1000 g. Thus, according to one embodiment as described herein, an accelerometer embedded into the sensor electronics is used to cause an imaging device, such as an uncooled camera core or other sensor or thermal imager, to immediately cease to function upon being exposed to shock levels, and/or repetition rates of high shock levels, above a certain threshold that is indicative of a military application (e.g., such as firing a weapon).

In one embodiment described herein, a low cost Commercial Off-The-Shelf (COTS) accelerometer (such as an airbag sensor, for example) is used to perform this function, as discussed further below. According to certain embodiments, the accelerometer has a unique serial number or identification number which may be verified at power-on (or at some other time) to inhibit any attempt to defeat this function by removing, replacing, or disabling the accelerometer, as discussed further below. Additionally, according to certain embodiments, the accelerometer is embedded into a high density package (e.g., such as a RCP, MCSiP, or SoC) of the imaging device to inhibit its removal from the device. Alternatively, in another embodiment, the accelerometer is encapsulated with a conventional printed wiring board.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram of one embodiment of an electro-optic device 100 that includes an embedded accelerometer 102. The electro-optic device 100 also includes an optics module 104, a detector sensor 106, a Read-Out Integrated Circuitry (ROIC) 108, an interface Printed Wiring Board (PWB) 110, a Ball Grid Array (BGA) 112 and an Integrated Circuit (IC) 113. According to one embodiment, the IC 113 is a SoC IC; however, in other embodiments, the IC may be configured differently. The SoC 113 includes a processor 114, a memory unit 116 and a power management unit 118.

The optics module 104 is coupled via the detector sensor 106 to the ROIC 108. The ROIC 108 is coupled to the BGA 112 via the interface PWB 110. The accelerometer 102 is mounted on the interface PWB 110 with the z-axis 120 in line with the optics module 104.

The optics module 104, detector sensor 106, and ROIC 108 provide sensed imaging data from the area surrounding the electro-optic device 100 to the SoC 113 via the PWB 110 and the BGA 112. According to one embodiment, the optics module 104 is a Long-Wavelength Infrared (LWIR) optics module; however, in other embodiments, any other type of optics module may be utilized. According to one embodiment, the detector sensor 106 is implemented in Wafer-Level Packaging (WLP); however, in other embodiments, the detector sensor 106 is configured differently. Also, according to one embodiment, the BGA 112 is a Redistributed Chip Packaging (RCP) BGA; however, in other embodiments a different type of BGA or conventional PWB based electronic packaging may be utilized.

The embedded accelerometer 102 is configured to prevent the electro-optic device from being adapted to military use by rendering the electro-optic device 100 inert or inoperable when subjected to shock levels associated with a military application. The embedded accelerometer 102 senses g-forces (i.e. acceleration) of the electro-optic device 100 and provides acceleration data to the SoC 113 (e.g., to the processor 114). When the accelerometer 102 senses acceleration associated with normal civilian use (e.g., less than 5 g), the SoC 113 operates the device 100 in normal operating mode. When the accelerometer 102 senses acceleration associated with a weapons application (e.g., more than 100 g), the SoC 113 renders the electro-optic device 100 inoperable.

According to one embodiment, the accelerometer 102 is configured to have a sensitivity that is matched to a military environment, so as to reduce "nuisance" tripping of the device, or "false alarms." For example, in one embodiment, the SoC 113 may be configured to "ignore" sensed acceleration forces from the accelerometer 102 of fewer than 100 g, or a similar threshold. In other embodiments, the acceleration threshold at which the SoC 113 disables the device 100 may be defined differently. For example, in some embodiments, the acceleration threshold is be defined as 50 g, 100 g, 500 g, 1000 g, or any other appropriate acceleration value that, if exceeded, indicates a military application of the device 100. In other embodiments, the acceleration threshold is defined in a range of 50 g-1000 g, 1000 g-5000 g, 100 g-1500 g, or any other appropriate range of acceleration values.

According to another embodiment, to reduce "nuisance" tripping, the SoC 113 is also configured to require the acceleration of the optics device 100 to exceed the threshold a certain number of times before disabling the device, as discussed in more detail below.

According to one embodiment, in response to the output of the accelerometer 102 indicating acceleration associated with a military application (e.g., acceleration above a certain threshold level), the SoC 113 is configured to permanently disable the electro-optic device 100. For example, in one embodiment, the SoC 113 is configured to erase at least a portion of the electro-optic device's flash memory when a shock above a threshold level (indicating military application) is detected, thereby rendering the unit inoperable. For example, according to one embodiment, the SoC 113 is configured to erase the electro-optic device's flash memory containing image normalization terms. In another embodiment, the SoC 113 is configured to erase the electro-optic device's flash memory containing image array configuration terms. According to another embodiment, the SoC 113 is configured to erase the electro-optic device's flash memory containing Field Programmable Gate Array (FPGA) or SoC program instructions.

According to another embodiment, in response to the output of the accelerometer 102 indicating acceleration associated with a military application, the SoC 113 is configured to send a signal to a portion of the electro-optic device 100 that permanently destroys the device. For example, in one embodiment, the SoC 113 is configured to send a signal to a switch within the electro-optic device 100 that, when closed, shorts the internal power of the device 100. In another embodiment, the SoC 113 is configured to send a signal to a switch within the electro-optic device 100 that, when closed, connects the device 100 to a power source that results in the destruction of the device 100.

According to one embodiment, normal operation of the electro-optic device 100 may be restored be returning the device 100 to the manufacturer.

According to one embodiment, the accelerometer 102 may be an automotive-grade accelerometer used for collision detection to deploy airbags, for example, as certain events associated with military applications and/or environments, such as weapons fire acceleration and shock profiles are consistent with automobile collisions. In one example, the accelerometer is a collision detection accelerometer commonly used for automotive airbag deployment and available from Freescale Semiconductor of Austin, Tex. under part number MMA5148KWR2. This example accelerometer may be rated to measure and report acceleration and shock profiles up to approximately 480 g. However, in other embodiments, any other type of accelerometer or similar shock sensing device may be utilized.

According to one embodiment, the accelerometer 102 is also configured to prevent a user from removing the accelerometer 102 from the electro-optic device 100 to defeat the accelerometer function. In one embodiment, the accelerometer 102 is packaged with the electro-optic device 100 using a high density packaging technology to prevent removal of the accelerometer 102 absent destruction of the device 100. For example, in one embodiment, the accelerometer 102 is embedded into an RCP of the electro-optic device 100 to inhibit removal of the accelerometer 102 from the device 100. Due to the dense and integrated nature of components within the RCP, attempts by an individual to remove the accelerometer from the RCP will likely result in the destruction of other hardware within the electro-optic device 100, rendering the device 100 inoperative.

According to one embodiment, the accelerometer 102 is embedded into an RCP using MCSiP technology. In a MCSiP, a plurality of integrated circuit dies, and optionally other discrete components, are positioned on a wafer and encapsulated using an epoxy encapsulate. Various semiconductor processing steps may be applied to the resulting wafer, for example, to interconnect the dies and other discrete components. U.S. patent application Ser. No. 13/164,432, titled "USING A MULTI-CHIP SYSTEM IN A PACKAGE (MC-SiP) IN IMAGING APPLICATIONS TO YIELD A LOW COST, SMALL SIZE CAMERA ON A CHIP" filed Jun. 20, 2011, describes embodiments of an MCSiP included in a camera and configured to provide imaging and processing functions associated with the camera.

Embodiments of an electro-optic device 100 implemented using an MCSiP, as discussed in U.S. patent application Ser. No. 13/164,432, may be well-suited to incorporate the embedded accelerometer 102 since many camera functions are implemented using dies that are integrated in a wafer package and interconnected using established semiconductor processing technologies. In addition, the encapsulate of the MCSiP will inhibit removal of the accelerometer 102 from the device 100 as attempts by an individual to remove the accelerometer 102 from the MCSiP encapsulate will likely result in the destruction of other hardware within the electro-optic device 100, rendering the device 100 inoperative.

In addition to physically inhibiting the removal of the accelerometer 102 through the use of a high density packaging technology, the electro-optic device 100 may also verify that the accelerometer 102 has not been removed or replaced by checking a unique identification number of the accelerometer 102. For example, according to one embodiment, a unique identification number, such as a unique 32 bit serial number, for example, is applied as an OTP (One Time Programmable) factory setting that is programmed and stored in encrypted memory in both the accelerometer 102, and in encrypted memory 116 within the electro-optic device 100.

Upon startup of the electro-optic device 100 (or at some other determined time), the processor 114 queries the accelerometer 102 and compares the accelerometer's programmed serial number to the serial number stored in encrypted memory 116. If the serial number received from the accelerometer 102 matches the expected serial number in memory 116, then the device enters into (or continues in) normal operational mode. If the processor 114 detects a mismatch between the serial number received from the accelerometer 102 and the expected serial number from memory 116, or if the accelerometer has been removed from the system (e.g., no accelerometer 102 serial number is detected), a flash memory erase command (e.g., as described above) is executed rendering the electro-optic device inoperable.

Figure 2:
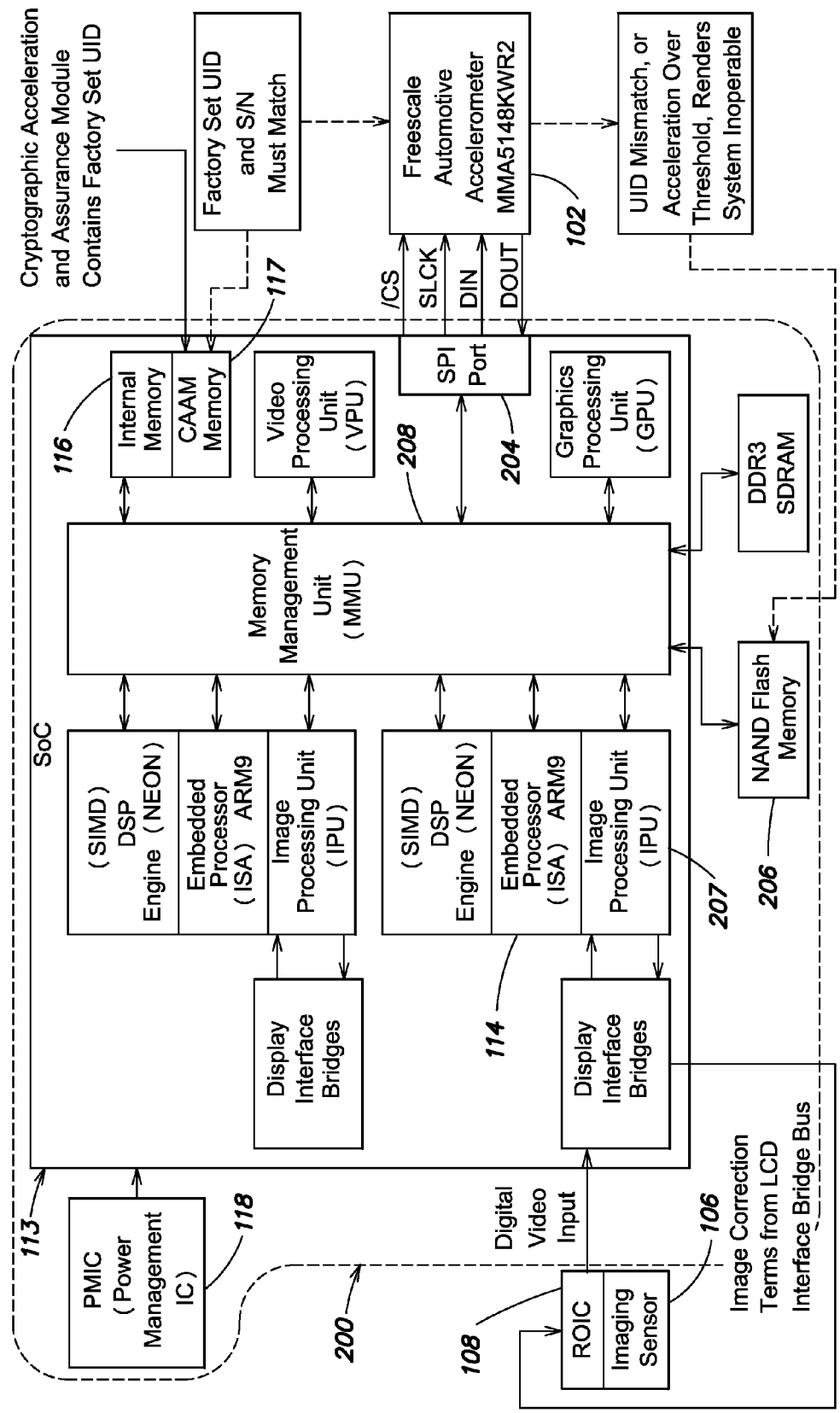
FIG. 2 is a more detailed block diagram of one example of an electro-optic device including an embedded accelerometer according to aspects of the invention.

FIG. 2 is a more detailed block diagram of one embodiment of an electro-optic device 200 that includes an embedded accelerometer 102. The electro-optic device 200 includes the SoC 113, the embedded accelerometer 102, the detector sensor 106, and the ROIC 108. The SoC 113 includes a processor 114, an Image Processing Unit (IPU) 207, a memory unit 116, a power management unit 118, a Serial Parallel Interface (SPI) port 204, a flash memory module 206, and a memory management module (MMU) 208.

The detector sensor 106 and the ROIC 108 are coupled to the IPU 207 of the SoC 113. The IPU 207 is coupled to the MMU 208. The embedded accelerometer 102 is coupled to the SoC 113 via the SPI port 204. The SPI port 204 is coupled to the MMU 208. The processor 114, flash memory module 206 and the memory unit 116 are each also coupled to the MMU 208. According to one embodiment, the memory unit 116 includes a Cryptographic Acceleration and Assurance Module (CAAM) 117. The power management module 118 is coupled to the SoC 113.

In normal operation, the detector sensor 106 and ROIC 108 provide sensed imaging data received from the optics module 104 (as shown in FIG. 1) to the IPU 207 for processing. As discussed above, the embedded accelerometer 102 is configured to prevent the electro-optic device 200 from being adapted to military use by rendering the electro-optic device 200 inert or inoperable when subjected to shock levels associated with a military application. The embedded accelerometer 102 senses g-forces (i.e. acceleration) of the electro-optic device 200 and provides acceleration data to the SoC 113 (e.g., to the processor 114). When the accelerometer 102 senses acceleration associated with normal civilian use (e.g., less than 5 g), the SoC 113 operates the device 200 in normal operating mode. When the accelerometer 102 senses acceleration associated with a weapons application or triggering circuitry (e.g., more than 100 g), the SoC 113 renders the electro-optic device 200 inoperable. As described above, in one embodiment, the accelerometer is a collision detection accelerometer commonly used for automotive airbag deployment and available from Freescale Semiconductor of Austin, Tex. under part number MMA5148KWR2.

According to one embodiment, the accelerometer 102 provides continuous acceleration data of the electro-optic device 200 to the processor 114 via the SPI port 204 and the MMU 208. The processor 114 is configured to monitor the acceleration data provided by the accelerometer 102 and determine whether the acceleration data exceeds a predetermined acceleration threshold. According to one embodiment, the predetermined acceleration threshold programmed into the processor is at least 100 g; however, in other embodiments, the acceleration threshold may be defined differently. If the processor 114 determines that the acceleration data has exceeded the predetermined acceleration threshold, then the processor 114 renders the electro-optic device 200 inoperable by sending a signal to the flash memory 206 via the MMU 208 to clear at least a portion of the flash memory 206 (e.g., as described above).

According to one embodiment, the processor 114 also monitors the number of times that the acceleration data received from the accelerometer 102 exceeds the predetermined acceleration threshold and will not transmit the erase command to the flash memory 206 until the acceleration data received from the accelerometer 102 has exceeded the predetermined acceleration threshold at least a predefined number of times. According to one embodiment, the predefined number of times that the acceleration threshold must be exceeded to render the electro-optic device 200 inoperable is defined as one. According to another embodiment, the predefined number of times that the acceleration threshold must be exceeded to render the electro-optic device 200 inoperable is defined as two, three or more, to reduce potential for a "false positive" indication of military application of the electro-optic device 200. In other embodiments, the predefined number of times that the acceleration threshold must be exceeded to render the electro-optic device 200 inoperable may be defined as any number. If the processor 114 determines that the acceleration data has exceeded the predetermined acceleration threshold at least the predefined number of times, then the processor 114 renders the electro-optic device 200 inoperable by sending a signal to the flash memory 206 via the MMU 208 to clear at least a portion of the flash memory 206 (e.g., as described above).

According to one embodiment, once the electro-optic device 200 is rendered inoperable, it is permanently destroyed. According to another embodiment, once the electro-optic device 200 is rendered inoperable, it can be reactivated by returning the unit to the manufacturer.

As discussed above, according to one embodiment, in an attempt to prevent interference with the accelerometer function, the accelerometer 102 is physically inhibited from being removed from the electro-optic device 200 without damaging the electro-optic device 200. In one embodiment, the accelerometer 200 and SoC 113 are embedded together into a high density package (e.g., a RCP, MCSiP, or SoC) of the electro-optic device 200.

As also discussed above, in addition to preventing the physical removal of the accelerometer 102 from the electro-optic device 200, the electro-optic device 200 may also check a Unique Identification Number (UIN) of the accelerometer 102 to confirm that the accelerometer 102 has not been removed or replaced from the electro-optic device. For example, according to one embodiment, a UIN, such as a unique 32 bit serial number, for example, is applied as an OTP (One Time Programmable) factory setting that is programmed and stored in encrypted memory in both the accelerometer 102, and in the CAAM 117 of the memory unit 116 within the electro-optic device 200. According to one embodiment, the UIN is stored within a Unique Identification Register (UIR) of the accelerometer 102.

Upon startup of the electro-optic device 200 (or at some other determined time), the processor 114 queries the accelerometer 102 and compares the accelerometer's programmed serial number in the UIR to the stored serial number in the CAAM 117. If the processor 114 detects a mismatch between the serial number stored in the accelerometer 102 and the serial number from the CAAM 117, or if the accelerometer 102 has been removed from the system (e.g., no accelerometer serial number is detected), the processor 114 sends a command to the flash memory 206 via the MMU 208 to erase at least a portion of the flash memory 206 (e.g., as described above), rendering the electro-optic device 200 inoperable. Therefore, removal or replacement of the accelerometer 102 originally associated with the electro-optic device 200 upon manufacture will result in the disabling of the electro-optic device 200.

Figure 3:
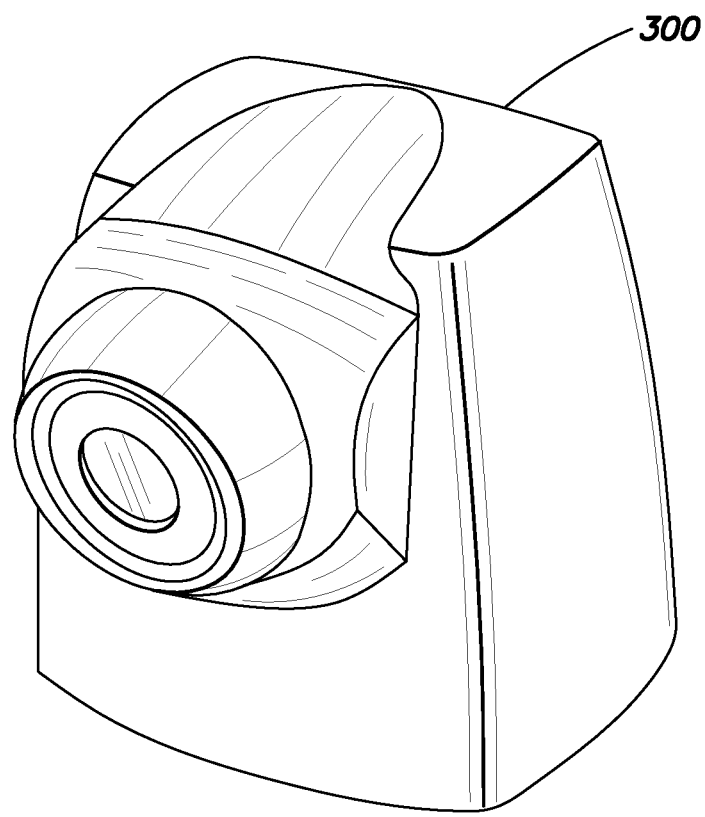
FIG. 3 is an illustration of one example of integrated product housing, according to aspects of the invention.

According to one embodiment, the electro-optic device 200 is provided in an integrated product housing 300, an example of which is illustrated in FIG. 3.

Figure 4:
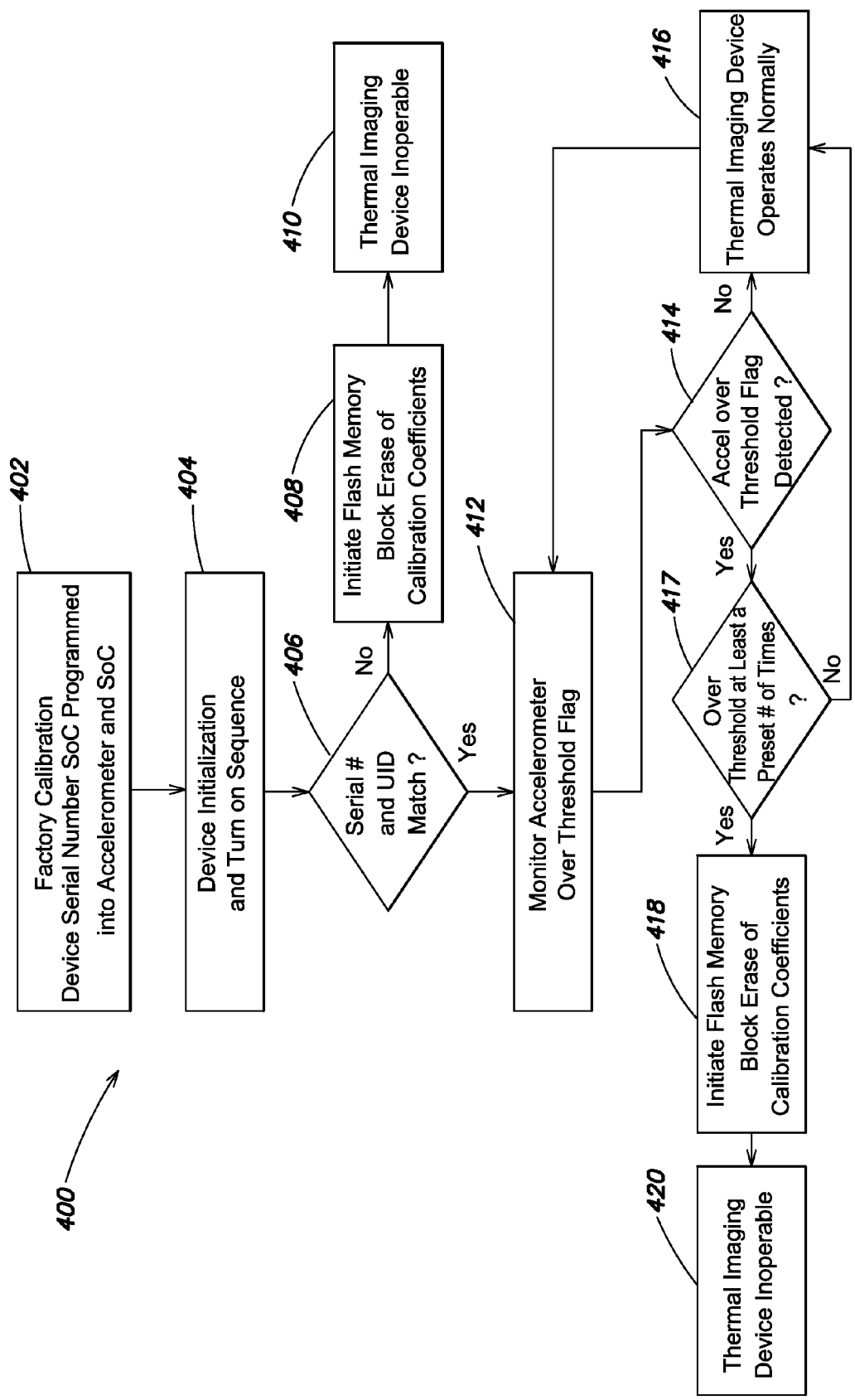
FIG. 4 is a flow diagram of one example of a method of using an embedded accelerometer to disable an electro-optics device, according to aspects of the invention.

FIG. 4 is a flow diagram 400 of one embodiment of a method of using an embedded accelerometer 102 to disable an electro-optics device 200, such as a thermal imaging device, for example, upon detection of a military application.

At step 402, a UIN, such as a unique 32 bit serial number, for example, is applied as an OTP (One Time Programmable) factory setting that is programmed and stored in encrypted memory in both the accelerometer 102, and in the memory unit 116 of the SoC 113 during factory calibration and final test for each electro-optics device 200. According to one embodiment, the UIN is stored in the UIR of the accelerometer 102.

At step 404, the electro-optics device 200 startup and initialization process is begun. At step 406, the processor 114 queries the accelerometer's UIN and compares it to the stored UIN in the memory unit 116 of the SoC 113. At step 408, in response to a determination that the accelerometer's UIN does not match the UIN stored in the SoC 113, or if the accelerometer 102 has been removed from the electro-optics device 200 (i.e. no accelerometer UIN is detected), the processor 114 sends a flash memory erase command to the flash memory 206 to clear the calibration coefficients (or other operational information as described above) within the flash memory 206. At step 410, in response to the flash memory 206 being erased, the electro-optics 200 device is inoperable.

At step 412, in response to a determination that the accelerometer's UIN matches the UIN stored in the SoC 113, the electro-optics device 200 enters normal operational mode. Upon entering normal operational mode, the processor 114 monitors the acceleration data provided by the accelerometer 102 via the SPI port 204.

At step 414, a determination is made by the processor 114 whether the acceleration data received from the accelerometer 102 exceeds a predetermined threshold. At step 416, in response to a determination by the processor 114 that the acceleration data received from the accelerometer 102 does not exceed the predetermined threshold, the electro-optics device 200 continues to operate normally.

At step 417 in response to a determination by the processor 114 that the acceleration data received from the accelerometer 102 exceeds the predetermined threshold, a determination is made whether the acceleration data received from the accelerometer 102 has exceeded the predetermined threshold at least a predefined number of times. At step 416, in response to a determination by the processor 114 that the acceleration data received from the accelerometer 102 has not exceeded the predetermined threshold at least the predefined number of times, the electro-optics device 200 continues to operate normally.

At step 418, in response to a determination by the processor 114 that the acceleration data received from the accelerometer 102 has exceeded the predetermined threshold at least the predefined number of times, the processor 114 sends a flash memory erase command to the flash memory 206 to clear the calibration coefficients (or other operational information as described above) within the flash memory 206. At step 420, in response to the flash memory 206 being erased, the electro-optics 200 device is inoperable.

As discussed above, a device, such as a thermal imager, camera, electronics associated with night-vision equipment, sensing device, or another electronic device, may be disabled upon detection of shock levels associated with a military application. As discussed above, since the accelerometer (or other shock-sensing sensor) may be embedded into the device hardware, particularly into RCP, MCSiP or SoC packages in some examples, defeating the accelerometer function may be difficult, and attempts to do so may destroy the device hardware. In addition, the use of unique identifiers as discussed above may provide additional security. Thus, aspects and embodiments may provide a simple and reliable mechanism for preventing diversion of high technology devices from the civilian marketplace into military applications, while still allowing the technology to be freely distributed within the civilian marketplace.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A sensing device comprising:
   an accelerometer configured to monitor acceleration of the sensing device and provide acceleration information including a value of the acceleration of the sensing device;
   a memory module; and
   an Integrated Circuit (IC) coupled to the accelerometer and the memory module, the IC comprising a processor that is configured to receive the acceleration information from the accelerometer and render the sensing device inoperable in response to the value of the acceleration of the sensing device exceeding a threshold,
   wherein in rendering the sensing device inoperable, the processor is further configured to transmit an erase command to the memory module to erase a portion of the memory module such that the sensing device is rendered inoperable;
   wherein the threshold is defined as a value of the acceleration in a range of approximately 50 g to 1000 g; and
   wherein the IC and the accelerometer are integrated together within one of a high density package and a printed wiring board.

2. The sensing device of claim 1,
   wherein the memory module is a flash memory module;
   wherein the IC further comprises a port coupled to the accelerometer and the processor; and
   wherein the processor is further configured to receive the acceleration information from the accelerometer and transmit the erase command to the flash memory module, to erase the portion of the memory module and render the sensing device inoperable, in response to the value of the acceleration of the sensing device exceeding the threshold.

3. The sensing device of claim 2,
   wherein the processor is further configured to monitor a number of times that the value of the acceleration of the sensing device exceeds the threshold and to transmit the erase command to the flash memory module, to render the sensing device inoperable, in response to the value of the acceleration of the sensing device exceeding the threshold at least a predefined number of times.

4. The sensing device of claim 2,
   wherein the accelerometer comprises a register that includes a first programmed Unique Identification Number (UIN),
   wherein the IC further comprises a memory unit coupled to the processor, the memory unit including a second programmed UIN, and
   wherein the processor is further configured to compare the first UIN with the second UIN and, in response to a determination that the first UIN and the second UIN are not identical, transmit the erase command to the flash memory module to render the sensing device inoperable.

5. The sensing device of claim 1, wherein an optics module, the IC and the accelerometer are located within an integrated product housing.

6. The sensing device of claim 1, wherein the IC and the accelerometer are integrated together within one of a Redistributed Chip Package (RCP), a Multi-Chip System in a Package (MCSiP), and a System on Chip (SoC) package.

7. The sensing device of claim 1, wherein the IC and the accelerometer are integrated together on a printed wiring board, and wherein the IC, the accelerometer, and the printed wiring board are encapsulated within a housing.

8. The sensing device of claim 1, wherein the sensing device is one of an image sensor, an infrared image sensor, and a visible image sensor.

9. A method for inhibiting an electronic device from being adapted for military uses, the method comprising:
   monitoring acceleration of the electronic device with an accelerometer coupled to the electronic device;
   determining, with a processor integrated together with the accelerometer within one of a high density package and a printed wiring board of the electronic device, whether the acceleration of the electronic device monitored by the accelerometer exceeds a predetermined threshold of at least 100 g; and
   in response to a determination that the acceleration of the electronic device exceeds the threshold, transmitting, with the processor, an erase command to a memory module within the electronic device to erase a portion of the memory module such that the electronic device is rendered inoperable.

10. The method of claim 9, wherein transmitting an erase command to the memory module includes transmitting an erase command to a flash memory module within the electronic device to erase the portion of the flash memory module and render the electronic device inoperable.

11. The method of claim 10, further comprising:
    monitoring a number of times that the acceleration of the electronic device exceeds the predetermined threshold, and
    in response to a determination that the acceleration of the electronic device has exceeded the predetermined threshold at least a predefined number of times, transmitting the erase command to the flash memory module within the electronic device to render the electronic device inoperable.

12. The method of claim 10, further comprising:
    comparing a Unique Identification Number (UIN) stored within the accelerometer to a UIN stored within the electronic device; and
    in response to a determination that the UIN stored within the accelerometer does not match the UIN stored within the electronic device, transmitting the erase command to the flash memory module within the electronic device to render the electronic device inoperable.

13. The method of claim 12, wherein comparing includes comparing a factory programmed serial number stored within the accelerometer to the UIN stored within the electronic device.

14. The method of claim 9, wherein monitoring acceleration of the electronic device with an accelerometer includes monitoring acceleration of the electronic device with an accelerometer embedded in one of a high density package, a Redistributed Chip Package (RCP), and a Multi-Chip System in a Package (MCSiP) of the electronic device.

15. The method of claim 9, wherein monitoring acceleration of the electronic device with an accelerometer includes monitoring acceleration of the electronic device with an accelerometer mounted on a printed wiring board of the electronic device and encapsulated within a housing.

16. An electronic device comprising:
an accelerometer configured to monitor acceleration of the sensing device and provide acceleration information including a value of the acceleration of the sensing device;
an Integrated Circuit (IC) coupled to the accelerometer, the IC comprising a processor that is configured to receive the acceleration information from the accelerometer and render the sensing device inoperable in response to the value of the acceleration of the sensing device exceeding a threshold of at least 100 g; and
means for coupling the electronic device to a power source such that power from the power source damages the electronic device and renders the electronic device inoperable, in response to receiving a signal from the IC,
wherein in rendering the sensing device inoperable, the IC is further configured to transmit the signal to the means for coupling the electronic device to the power source such that the power from the power source damages the electronic device and renders the electronic device inoperable, and
wherein the IC and the accelerometer are integrated together within one of high density package and a printed wiring board.

17. The electronic device of claim 16, further comprising means for inhibiting removal of the accelerometer from the electronic device without damage to the IC.

18. The electronic device of claim 17, further comprising means for determining whether the accelerometer has been removed from the electronic device and for rendering the electronic device inoperable in response to a determination that the accelerometer has been removed.

* * * * *